United States Patent [19]

Grandi

[11] Patent Number: 5,271,572
[45] Date of Patent: Dec. 21, 1993

[54] DEVICE FOR THE SELECTION, CRUSHING AND MIXING OF FRUITS FOR PREPARING DESSERTS

[76] Inventor: René Grandi, Loudon-Ruy, F-38300 Bourgoin-Jallieu, France

[21] Appl. No.: 853,727

[22] Filed: May 29, 1992

[30] Foreign Application Priority Data

Dec. 5, 1989 [FR] France .................... 89 16168

[51] Int. Cl.⁵ .................. A23G 9/28; A23G 3/20; A47J 43/04; B02C 19/08
[52] U.S. Cl. .................. 241/199.2; 241/199.7; 241/199.12; 99/510; 366/186; 366/323
[58] Field of Search ........... 241/199.12, 199.2, 199.7; 99/510, 455; 366/186, 196, 318, 323

[56] References Cited

U.S. PATENT DOCUMENTS

| | | |
|---|---|---|
| 1,764,760 | 6/1930 | Soule .................. 241/152.2 |
| 2,167,536 | 7/1939 | Suits . |
| 2,433,141 | 12/1947 | McPherson . |
| 3,285,198 | 11/1966 | Hornstein . |
| 3,291,076 | 12/1966 | Flanigan et al. . |
| 3,918,862 | 11/1975 | Bellew . |
| 4,010,284 | 3/1977 | Bellew . |
| 4,447,458 | 5/1984 | Roth et al. . |
| 4,590,852 | 5/1986 | Mayer et al. .......... 366/318 X |
| 4,645,093 | 2/1987 | Jones . |
| 4,693,611 | 9/1987 | Verkler ................ 366/196 X |
| 4,702,608 | 10/1987 | Garbar et al. ........ 366/196 X |
| 4,708,489 | 11/1987 | Carlson . |

FOREIGN PATENT DOCUMENTS

| | | |
|---|---|---|
| 828650 | 5/1938 | France . |
| 528679 | 6/1955 | Italy ................... 241/199.12 |
| 250320 | 6/1948 | Switzerland ........ 241/199.12 |
| 259780 | 6/1949 | Switzerland ........ 241/199.12 |

*Primary Examiner*—Mark Rosenbaum
*Assistant Examiner*—Frances Chin
*Attorney, Agent, or Firm*—Sandler Greenblum & Bernstein

[57] ABSTRACT

Apparatus for selecting, mixing and preparing, as required, fresh desserts made up of crushed fruits mixed with a natural cream, provided with a distribution cone having several compartments containing different fruits which pivots about a central body serving as a container for the cream which is ready to be added and mixed with a selected fruit. A compartment within the distribution cone is positionable over a bowl next to a motor, the driven pinion of which engages with a gear of the mixing bowl for the selected fruit, whereby the selected fruit is crushed and then mixed with natural cream by means of a worm gear and the associated blade.

25 Claims, 1 Drawing Sheet

DEVICE FOR THE SELECTION, CRUSHING AND MIXING OF FRUITS FOR PREPARING DESSERTS

BACKGROUND OF THE INVENTION

Fresh or frozen fruit dispensing devices are known, that after a crushing operation, enable desserts and creams, iced or not, to be prepared by mixing such fruits with a neutral cream that does not denaturalize the flavor of the fruit added.

But other than dispensing the given fruits, their crushing and mixing with cream must be done manually by an operator, who must crush the selected fruit with an individual crusher, and then mix it with neutral cream in order to finally give it to the consumer.

All these operations involve long and fastidious work. Moreover, each time the fruit flavor is changed, the crusher and all other instruments that are necessary for these operations must be rinsed. These actions delay the dispensing process even more.

SUMMARY OF THE INVENTION

The device according to the present invention avoids these handling inconveniences, an the same time retains perfect hygiene by the constant refrigeration of the stored fruits, and the fruits that are crushed and mixed with the cream. Cleaning the entirety of the device is not necessary on a daily basis.

It is constituted by a fruit distribution cone, such fruits being either fresh or frozen (strawberries, bananas, blueberries, cherries, raisins, etc. . . . ), but all of these must be sized so as to be crushed more easily.

This cone has several compartments, 6 or 8, and is mounted on a distribution crown driven by a motor, the assembly forming a selection carousel.

On the periphery of the cone, windows enable the customers to check the fruits of their choice.

Each of the compartments also individually comprises an endless screw and a mixing bowl, to enable the continuous distribution of fruits having different tastes, without having to change and rinse the instruments each time.

The endless screw enables both the introduction of the selected fruit in the bowl, and then its crushing or breaking, by means of a blade made of edible "nylon" or stainless steel located at its end, such blade also having the function of mixing and whipping the crushed fruits with the neutral cream introduced in turn in the mixing bowl.

To undertake the required operation according to the fruit selected, the distribution cone turns about a central cylindrical body, acting as a receptacle, by means of the distribution crown and its motor.

This receptacle is divided into two portions at the level of the distribution crown, one of the portions contains a neutral cream, iced or not, and the other, a different cream, such as "whipped" cream, for the decoration of the dessert ready to be eaten.

Each of the receptacles comprises a piston, activated by an endless screw with a motorized ball screw, which pushes the cream to introduce it, via a neck, into the mixing bowl of crushed fruits, so as to be mixed with these, insofar as the neutral cream is concerned.

Each piston comprises at its periphery a scraping joint, enabling its sealing during the thrust.

Each of the necks of the receptacles is equipped with an anti-return valve, enabling the orifice to be closed when the cream is no longer pushed.

A cover enables the upper receptacle to be filled, whereas the filling of the lower receptacle is done by means of an opening located at the top of the wall of the latter.

These receptacles containing creams are refrigerated by evaporator coils, whose coolness is produced by a compressor located in the lower portion of the device. These coils are located all around the external walls of the receptacles.

This refrigeration also enables the distribution cone to be refrigerated, as well as the mixing bowl, maintaining the stored fruits and the fruits that are crushed and mixed with the cream in a cold environment.

By its gyrating movement, the cone turning on its crown about the central body constituted by the receptacle and the evaporator coils (this assembly being fixed) positions the selected fruit compartment as well as the mixing bowl over a cup or recipient receiving the final product.

The mixing bowl comprises a gear at its periphery, and once the fruit has been selected and the cone positioned, a reducing motor with a pinion drives and turns the mixing bowl, so as to crush the fruits and then mix them with the cream.

Once the mixture of the fruits and the cream is done, it is introduced into the cup by means of a handle that the user will have activated, thus releasing the mixing bowl, but this function is done automatically, as well as the decoration function of the cup with whipped cream.

All these operations can be done either manually, or they can be motorized. The choice and quantities can also be determined electronically by controls located on a console. The device can thus work without an operator, and with a coin device, like any other automatic dispenser.

If so desired, this device can only serve squeezed fruits without an admixture of neutral cream or without whipped cream.

In order to enable the endless screw to correctly drive and crush the fruits, all such fruits must be calibrated.

By means of this device, there is also the possibility of directly preparing ice-cream, by introducing via the peak of the device and via the hollow endless screw, a whipper activated by a motor, this whipper being removed when the preparation is completed, thus releasing the piston for pushing the cream.

The whipper and motor assembly is fixed to the upper receptacle by screw valves, or by a quicker clicking system.

By all these means, the device described enables the preparation and distribution of different types of desserts, sweet dishes, or even drinks with squeezed fruits.

For the latter preparation of squeezed fruits, wastes can be evacuated either by an opening in the bowl, or by an automatic inverse movement of the blade of the bowl, driving the wastes with it, and evacuating them via the opening provided in the bowl.

The covering of this distribution carousel is provided with a strong insulation so as to preserve the products, and keep them in a refrigerated environment.

BRIEF DESCRIPTION OF THE DRAWINGS

The drawings annexed herewith illustrate a non-limiting example of one embodiment of the invention. Wherein.

DETAILED DESCRIPTION OF THE PREFERRED EMBODIMENTS

Figure 1:
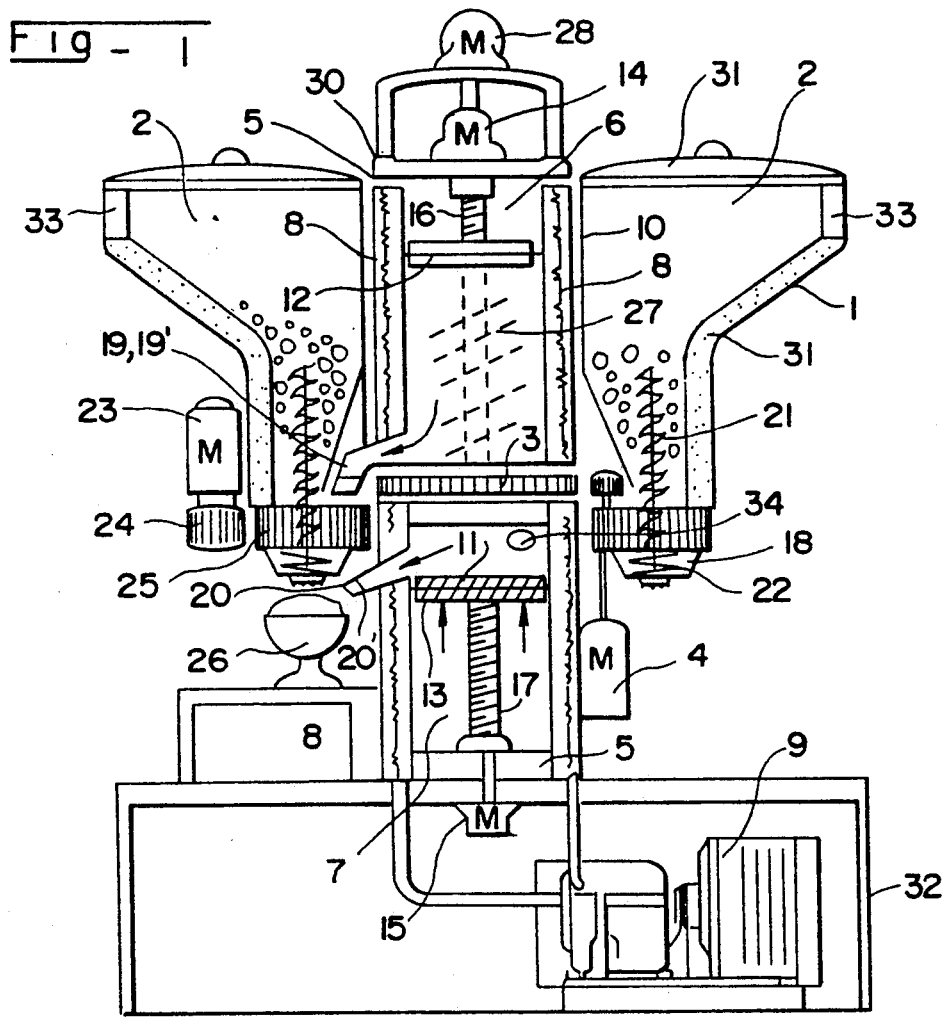
FIG. 1 represents the device or selection carousel in its entirety, in a transverse section.

In FIG. 1, the selection carousel comprises the distribution cone 1, having several compartments 2, driven by crown 3 and its motor 4. The fixed central body 5 is constituted by two receptacles 6 and 7, containing neutral cream and whipped cream.

The fixed central body 5 is refrigerated by evaporator coils 8, and compressor 9 located in the lower portion 32 of the device on which it is fixed.

Receptacle 6 includes a piston 10 having a scraping joint 12, and receptacle 7 includes a piston 11 having a scraping joint 13. Motors 14 and 15 activate the pistons 10 and 11 by means of endless screws having ball screws 16 and 17, to thrust the cream. The cream from receptacle 6 is pushed into the mixing bowl 18 through outlet spout 19 where the endless screw 21, located in each fruit compartment 2, has pushed the selected fruit to be crushed by means of its blade 22 located at its end while the cream from receptacle 7 is pushed through outlet spout 20 into container 26.

Anti-return valves 19' and 20' enable spouts 19 and 20 to be shut when the cream is no longer pushed in.

The cream contained in the lower receptacle 7 is introduced in the latter by an orifice 34.

This operation is done automatically, as soon as the fruit compartment 2 is positioned in front of motor 23, which drives by its gear 24, the gear 25 of mixing bowl 18, and by making it turn, enables the fruits to be crushed and then mixed with the neutral cream.

A cup or a container 26 receives the dessert ready to be eaten.

For the direct preparation of the cream in upper receptacle 6, a whipper 27 is activated by a motor 28 that is clicked on the device by means of screw threads 30, or another clicking system for quick removal of this assembly, once the cream has been obtained.

A strong insulation 31 enables the loss of calories to be avoided.

Windows 33, located on the periphery of each fruit compartment 2, enables the user to see the contents.

Figure 2:
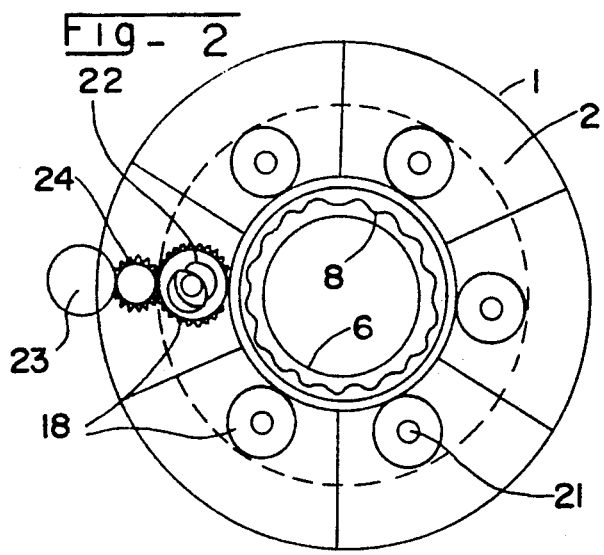
FIG. 2 represents a top view of the device.

In FIG. 2, one can see the fruit compartments 2 of distribution cone 1, the receptacle 6 and the evaporator coils 8, as well as motor 23, its gear 24 meshed in gear 25 of mixing bowl 18 containing the blade 22 of endless screw 21.

Figure 3:
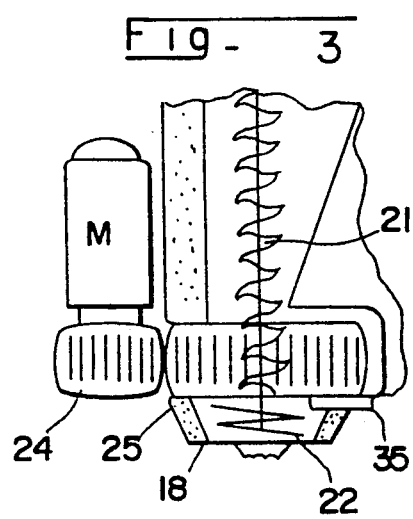
FIG. 3 represents the endless screw and its crushing blade in the mixing bowl having a gear.

FIG. 3 shows endless screw 21, with the crushing blade 22 at its end, in mixing bowl 18 with gear 25, becoming meshed in gear 24 of motor 23 to crush and mix the fruits and cream. Orifice 35 enables wastes to be evacuated during the inverse rotation of blade 22 for making squeezed fruits.

The shapes, sizes and arrangements of the different elements can vary in equivalents thereof, as can the materials and means used for their manufacture, without resulting in a change in the general concept of the invention which has just been described.

I claim:

1. Apparatus for the preparation and dispensing of desserts by crushing selected fruits, and then mixing them with a neutral cream, comprising:
   a motorized crown;
   a first receptacle capable of containing a neutral cream for mixing with crushed fruit; and
   a rotatable distribution cone including a plurality of fruit compartments, said rotatable distribution cone being associated with said motorized crown to rotate about said first receptacle.

2. The apparatus according to claim 1, wherein said first receptacle is cylindrical.

3. The apparatus according to claim 1, further including insulation for maintaining the temperature of the first receptacle and the fruit compartments.

4. The apparatus according to claim 1, wherein each of said plurality of fruit compartments includes a cover.

5. The apparatus according to claim 1, wherein each of said plurality of fruit compartments includes a window.

6. The apparatus according to claim 1, further including a means for whipping inserted in said first receptacle.

7. The apparatus according to claim 1, further including means for refrigeration for maintaining cool fruits contained in said plurality of fruit compartments of said distribution cone, as well as fruits that are crushed and mixed with the cream in the mixing bowl.

8. The apparatus according to claim 7, wherein said first receptacle includes a periphery, and said means for refrigeration comprise evaporator coils along said periphery.

9. The apparatus according to claim 8, wherein said evaporator coils surround said first receptacle.

10. The apparatus according to claim 1, wherein each of said plurality of fruit compartments comprises a mixing bowl, an endless screw to introduce selected fruits into said mixing bowl, and a blade located at an end of said endless screw to crush the selected fruit.

11. The apparatus according to claim 10, further including a motor having a first gear; and said mixing bowl includes a second gear capable of being meshed with said first gear when said mixing bowl is positioned at a selected dispensing location, whereby said mixing bowl can be rotated for crushing the selected fruits and mixing with neutral cream.

12. The apparatus according to claim 10, further including an outlet opening in said first receptacle.

13. The apparatus according to claim 12, further including means for rotating said blade in a reverse direction to expel waste materials through said outlet opening.

14. The apparatus according to claim 11, including a central body comprising two receptacles, said two receptacles comprising an upper receptacle comprising said first receptacle, and a lower receptacle adapted to contain another cream for finishing or decorating the dessert.

15. The apparatus according to claim 14, further including means for refrigeration for maintaining cool fruits contained in said plurality of fruit compartments of said distribution cone, as well as fruits that are crushed and mixed with the cream in the mixing bowl.

16. The apparatus according to claim 15, wherein said central body includes a periphery, and said means for refrigeration comprise evaporator coils along said periphery.

17. The apparatus according to claim 16, wherein said evaporator coils surround said upper receptacle and said lower receptacle.

18. The apparatus according to claim 14, wherein each of said upper receptacle and said lower receptacle includes a piston having a scraping joint to push the cream.

19. The apparatus according to claim 18, including an endless screw with a motorized ball screw to activate said piston.

20. The apparatus according to claim 18, wherein said upper receptacle includes a first spout to feed cream to said mixing bowl.

21. The apparatus according to claim 20, wherein said lower receptacle includes a second spout to feed cream to a container.

22. The apparatus according to claim 14, further including a valve in each of said first spout and said second spout.

23. The apparatus according to claim 14, further including at least one container.

24. The apparatus according to claim 21, further including at least outlet opening.

25. The apparatus according to claim 22, further including means for rotating said blade in a reverse direction to expel waste materials through said outlet opening.

* * * * *